United States Patent
Jones et al.

(10) Patent No.: US 12,263,528 B2
(45) Date of Patent: Apr. 1, 2025

(54) ADDITIVE MANUFACTURING

(71) Applicant: RENISHAW PLC, Wotton-under-Edge (GB)

(72) Inventors: Kiera Megan Jones, Stroud (GB); Paul Martin Scully, Stroud (GB)

(73) Assignee: RENISHAW PLC, Wotton-under-Edge (GB)

( * ) Notice: Subject to any disclaimer, the term of this patent is extended or adjusted under 35 U.S.C. 154(b) by 707 days.

(21) Appl. No.: 17/289,184

(22) PCT Filed: Nov. 12, 2019

(86) PCT No.: PCT/GB2019/053196
§ 371 (c)(1),
(2) Date: Apr. 27, 2021

(87) PCT Pub. No.: WO2020/099852
PCT Pub. Date: May 22, 2020

(65) Prior Publication Data
US 2021/0394272 A1   Dec. 23, 2021

(30) Foreign Application Priority Data
Nov. 12, 2018   (GB) ..................................... 1818385

(51) Int. Cl.
*B22F 10/85*   (2021.01)
*B22F 10/366*   (2021.01)
(Continued)

(52) U.S. Cl.
CPC ............ *B22F 10/85* (2021.01); *B22F 10/366* (2021.01); *B22F 12/90* (2021.01); *B33Y 50/02* (2014.12); *B22F 10/28* (2021.01)

(58) Field of Classification Search
CPC ........ B22F 10/85; B22F 10/366; B22F 12/90; B22F 10/28; B22F 10/38; B22F 2999/00;
(Continued)

(56) References Cited

U.S. PATENT DOCUMENTS 8,034,279 B2   10/2011   Dimter et al.
10,744,598 B2   8/2020   Hall
(Continued)

FOREIGN PATENT DOCUMENTS

EP   2 786 858 A1   10/2014
EP   3 147 047 A1   3/2017
(Continued)

OTHER PUBLICATIONS

Babjak, Benjamin et al., "Analysis and Efficient Onset Time Detection of Acoustic Emission Signals With Power Constrained Sensor Platforms", pp. 1-4.
(Continued)

*Primary Examiner* — Tameem D Siddiquee
(74) *Attorney, Agent, or Firm* — Oliff PLC

(57) ABSTRACT

A computer implemented method including receiving first sensor data from a first sensor monitoring an additive manufacturing process, the first sensor data including a plurality of first sensor values; receiving second sensor data from a second sensor monitoring the additive manufacturing process, the second sensor data including a plurality of second sensor values. Each first sensor value and each second sensor value is associated with a corresponding time during the additive manufacturing process at which the sensor value was generated. Analysing the first and second sensor data to identify a first and second anomalous event that occurred in the additive manufacturing process and a corresponding first and second anomalous event time. Identifying whether the first anomalous event is a potential cause
(Continued)

of second anomalous event based upon the anomalous event times. Generating an output based upon identification that the first anomalous event is a potential cause of second anomalous event.

13 Claims, 3 Drawing Sheets

(51) Int. Cl.
*B22F 12/90* (2021.01)
*B33Y 50/02* (2015.01)
*B22F 10/28* (2021.01)

(58) Field of Classification Search
CPC ......... B33Y 10/00; B33Y 50/02; B33Y 30/00; B29C 64/393; B29C 64/153; Y02P 10/25
See application file for complete search history.

(56) References Cited

U.S. PATENT DOCUMENTS

| | | | |
|---|---|---|---|
| 10,857,735 B1* | 12/2020 | Martin et al. | ......... B29C 64/386 |
| 10,993,468 B2 | 5/2021 | Nam | |
| 11,305,354 B2 | 4/2022 | Revanur et al. | |
| 2013/0168902 A1 | 7/2013 | Herzog et al. | |
| 2017/0087635 A1 | 3/2017 | Wilkes et al. | |
| 2017/0108849 A1* | 4/2017 | Kaneko | ................ G05B 19/408 |
| 2017/0227408 A1* | 8/2017 | Helvajian | ............... B22F 10/38 |

FOREIGN PATENT DOCUMENTS

| | | | |
|---|---|---|---|
| EP | 3 590 631 A1 | 1/2020 | |
| WO | 2007/147221 A1 | 12/2007 | |
| WO | 2014/125281 A2 | 8/2014 | |
| WO | 2014/199150 A1 | 12/2014 | |
| WO | 2016/079494 A2 | 5/2016 | |
| WO | 2016081651 A1 | 5/2016 | |
| WO | 2016/102970 A1 | 6/2016 | |
| WO | 2016/198885 A1 | 12/2016 | |
| WO | WO2016198885 * | 12/2016 | ............ B29C 67/00 |
| WO | 2017/085468 A1 | 5/2017 | |
| WO | 2017/085469 A1 | 5/2017 | |
| WO | 2017/085470 A1 | 5/2017 | |

OTHER PUBLICATIONS

Grasso, Marco et al., "Process Defects and in Situ Monitoring Methods in Metal Powder Bed Fusion: a Review", Measurement Science and Technology, vol. 28, (2017), pp. 1-25.
Tapia, Gustavo et al., "A Review on Process Monitoring and Control in Metal-Based Additive Manufacturing", Journal of Manufacturing Science and Engineering, vol. 136, (Dec. 2014), pp. 060801-1-060801-10.
Vlasea, M. L. et al., "Development of Powder Bed Fusion Additive Manufacturing Test Bed for Enhanced Real-Time Process Control", pp. 527-539.
Jan. 7, 2020 Search Report issued in International Patent Application No. PCT/GB2019/053196.
Jan. 7, 2020 Written Opinion issued in International Patent Application No. PCT/GB2019/053196.

* cited by examiner

ADDITIVE MANUFACTURING

FIELD OF INVENTION

This invention concerns an additive manufacturing system for evaluating sensor data generated by sensors monitoring an additive manufacturing process and associated method. The invention has particular application to the identification of flaws and/or failures in an additive manufacturing build from the sensor data.

BACKGROUND

Additive manufacturing or rapid prototyping methods for producing parts comprise layer-by-layer solidification of a flowable material. There are various additive manufacturing methods, including powder bed systems, such as selective laser melting (SLM), selective laser sintering (SLS), electron beam melting (EBM) and stereolithography, and non-powder bed systems, such as fused deposition modelling, including wire arc additive manufacturing.

Powder bed fusion apparatus produce objects through layer-by-layer solidification of a material, such as a metal powder material, using a high-energy beam, such as a laser or electron beam. A powder layer is formed across a powder bed contained in a build sleeve by lowering a build platform to lower the powder bed, dosing a heap of powder adjacent to the lowered powder bed and spreading the heap of powder with a recoater across (from one side to another side of) the powder bed to form the layer. Portions of the powder layer corresponding to a cross-section of the workpiece to be formed are then solidified through irradiating these areas with the beam. The beam melts or sinters the powder to form a solidified layer. After selective solidification of a layer, the powder bed is lowered by a thickness of the newly solidified layer and a further layer of powder is spread over the surface and solidified, as required.

Various sensors are used to monitor the powder bed fusion process.

For example, WO2007147221 discloses sensors for monitoring light emitted from a melt region generated during a laser powder bed fusion process. The sensor may be an integrating detector, for example a photodiode, which generates a single output signal upon incidence of the electromagnetic radiation emitted or reflected by the moving observation zone or a spatially resolved detector for providing 2D images of the melt zone. US2013168902 discloses mapping of data derived from the sensor data based upon a capture location of the sensor values in the component being manufactured.

WO2016/198885 discloses passive acoustic sensors for detecting acoustic signals generated during an additive manufacturing process.

WO2017/085468 discloses numerous sensors used to monitor an additive manufacturing process and using a "fingerprint" of the sensor signals for one or more previous builds of a workpiece to validate future builds of nominally identical workpieces.

WO2017/085469 discloses time stamping sensor data obtained by sensors for monitoring an additive build. The time stamp may allow the sensor data to be linked back to actions that were executed at that time.

SUMMARY OF INVENTION

According to a first aspect of the invention there is provided a computer implemented method comprising receiving first sensor data from a first sensor monitoring an additive manufacturing process, the first sensor data comprising a plurality of first sensor values; receiving second sensor data from a second sensor monitoring the additive manufacturing process, the second sensor data comprising a plurality of second sensor values, wherein each first sensor value and each second sensor value is associated with a corresponding time during the additive manufacturing process at which the sensor value was generated; analysing the first sensor data to identify a first anomalous event that occurred in the additive manufacturing process and a corresponding first anomalous event time; analysing the second sensor data to identify a second anomalous event in the additive manufacturing process and a corresponding second anomalous event time; identifying whether the first anomalous event is a potential cause of the second anomalous event based upon, at least in part, the first anomalous event time and the second anomalous event time; and generating an output based upon an identification that the first anomalous event is a potential cause of the second anomalous event.

In this way, the cause of an anomalous event in the additive manufacturing apparatus may be automatically identified and appropriate action taken. This is enabled by the association of the sensor values from each of the first and second sensors with a time during the additive manufacturing process. In particular, it may be possible to identify from the first or second data in isolation an anomalous event, such as a crack in the part or an incorrectly dosed layer, but it may not be possible to determine from this data in isolation the cause of this anomalous event and whether it amounts to a failure of the build that can be remedied or whether it is a critical failure of the build, requiring abandonment of the build. Identifying the potential cause of an anomalous event increases the information available for making such a decision. The collection and analysis of sensor data from different sensors sequenced to a common time clock allows one to deduce information on the cause of an anomalous event.

Furthermore, a likelihood that an earlier anomalous event is the cause of a later anomalous event may be deduced from the relative timings of the events. For example, anomalous artefacts in an image of a powder layer after the powder layer has been formed by a recoater may have several potential causes, such as damage to the recoater or the ejection of a large particle from the bed when forming a previous layer, the large particle subsequently dragged across the powder bed by the recoater. Both effects could result in lines in the image of freshly coated powder layer. If sensor data from another sensor, such as an acoustic sensor, has been analysed to identify that a crack in a part being manufactured and/or support failure occurred shortly before the artefact appeared in the image(s) of the powder bed, it may lead to the conclusion that it is likely that the anomaly in the image of the powder layer was caused by the part deforming and projecting above the surface of the powder bed, which caused subsequent damage to the recoater. Alternatively, if the acoustic data indicated an injection of a large particle in the formation of the previous layer then the cause may be attributed to the presence of a large particle on top of the powder bed. The former may require appropriate action to be taken, such as halting the build or changing a wiper of the recoater. The latter may require different or no action.

Identifying whether the first anomalous event is the potential cause of the second anomalous event may be based, at least in part, on the relative timings of the first and second anomalous events. A likelihood that an identified earlier anomaly is a cause of a later anomaly is likely, in part, to depend on the relative timing between the two events. By having timings associated with the first and second sensor data and the first and second data gathered at a common data hub, the relative timings of the anomalous events can be determined, and potential causes of anomalies identified.

The output may be a display of a representation identifying a potential correlation between the first and second anomalous events. The output may be an alert identifying the existence of an anomalous event in the additive manufacturing process.

The output may be a command signal, which causes a change in the additive manufacturing process. For example, the command signal may cause a halt in the additive manufacturing process, a change of wiper, switching over between filters for filtering gas flow through a build chamber, a change in gas flow through the build chamber (flow rate through the build chamber, for example achieved through altering the pump speed, and/or a ratio of gas volume delivered per unit time through different gas nozzles into the gas flow chamber, for example between gas flow from the ceiling and gas flow through a gas knife as disclosed in US2017/087635, which may be achieved through activation of appropriate valves) and/or change in scan parameters of an energy beam (such as power of an energy beam, scan speed, point distance, exposure time, spot size or shape of the energy beam on a powder bed/at a working plane).

The output may be a modification of build instructions for a future additive manufacturing process.

The second sensor is a different sensor to the first sensor. The second sensor may sense a different sensory modality (such as visual, infra-red, acoustic, pressure, chemical, gas flow rate, and the like) to the first sensor.

The first sensor may comprise a pyrometer, for example, for measuring the temperature of a material bed and/or a melt pool, acoustic sensor, which may be used to derive attributes of various aspects of the process, as is described in WO2016/198885, incorporated herein by reference, a position sensitive device and/or a photodiode, for example, for measuring the temperature and/or size of a melt pool through the optical train for steering a laser beam, a spectrometer, for measuring spectral emissions from the melt pool and/or a plasma plume generated during melting of the material, a position sensitive device (PSD) for measuring a position of an energy beam spot or melt pool within a filed of view, a camera, for example a thermal (infra-red) camera for measuring a temperature of the material bed or a visible light camera for measuring deformations of the workpiece during the build, a force feedback sensor for example, a load sensor on a wiper, a pressure sensor, for example for measuring gas pressure in a build chamber or a pressure difference across a filter element for filtering condensate from gas recirculated through the build chamber, a mass flow sensor, for example, for measuring a mass of gas recirculated through the build chamber, an oxygen sensor, for example, for measuring the oxygen concentration in the build chamber, an encoder, for example, for measuring the position, speed and/or accelerations/decelerations of a wiper for spreading a layer of material and/or an elevator mechanism.

The second sensor may comprise a pyrometer, for example, for measuring the temperature of a material bed and/or a melt pool, acoustic sensor, which may be used to derive attributes of various aspects of the process, as is described in WO2016/198885, incorporated herein by reference, a position sensitive device and/or a photodiode, for example, for measuring the temperature and/or size of a melt pool through the optical train for steering a laser beam, a spectrometer, for measuring spectral emissions form the melt pool and/or a plasma plume generated during melting of the material, a position sensitive device (PSD) for measuring a position of an energy beam spot or melt pool within a filed of view, a camera, for example a thermal (infra-red) camera for measuring a temperature of the material bed or a visible light camera for measuring deformations of the workpiece during the build, a force feedback sensor for example, a load sensor on a wiper, a pressure sensor, for example for measuring gas pressure in a build chamber or a pressure difference across a filter element for filtering condensate from gas recirculated through the build chamber, a mass flow sensor, for example, for measuring a mass of gas recirculated through the build chamber, an oxygen sensor, for example, for measuring the oxygen concentration in the build chamber, an encoder, for example, for measuring the position, speed and/or accelerations/decelerations of a wiper for spreading a layer of material and/or an elevator mechanism.

Each of the first and second sensor data may be arranged in a file format including the corresponding times. Receiving the first and second data may comprise receiving a first file containing the first data and corresponding times and a second file containing the second data and corresponding times or a single file containing both the first and second data and corresponding times. The corresponding time may provide a unique key of a database comprising the first and second sensor data. The database may include further data, such as further sensor data from a further sensor(s) and/or demand data issued to the additive manufacturing apparatus for carrying out the build. For example, the demand data may comprise a plurality of commands, such as demand positions for beam steering elements, build height (z-height of the build), layer number, energy beam power, scanning speed of the energy beam across a working surface (the powder bed), spot size/focal position of the energy beam on the working surface, hatch distance, point distance, exposure time, jump delay (a delay time between finishing a move and firing the energy beam to allow the steering elements to settle), recoater position and/or other time varying parameter used in the additive manufacturing process. Each command may be associated with a corresponding time at which the command is to be executed. In this way, the analysis may comprise a comparison of the difference between a demanded parameter and a measured parameter, for example, a demanded and measured position of the steering elements. A difference that is above a threshold value may be flagged as an anomaly. A later anomaly identified in other sensor data may be deemed to be caused by the identified failure to achieve the demanded parameter. For example, a failure of the steering element to achieve a demanded position of the energy beam spot within a required threshold may result in later overheating of a region of the powder bed as detected using a thermal camera or an on-axis optical sensor, or porosity in the part as detected using a visible light or infrared camera. Having the sensor values and commands associated with corresponding timings allows the computer to automatically associate this potential cause of a later anomaly.

The first and second anomaly may be identified using a suitable algorithmic classifier.

The algorithmic classifier may analyse the (first and/or second) sensor data segmented into a plurality of data blocks of sensor values. Each data block may comprise sensor values gathered within a particular time period. An anomalous event may result in a characteristic signature across a data block of the sensor values, hence it may be necessary to analyse a sequence of the sensor values. If the algorithmic classifier identifies an anomalous event from a one of the data blocks of the sensor values, the corresponding anomalous event time is determined from the corresponding times associated with that data block of sensor values, for example, a start, end or central time for the time period of the data block or a time derived from analysis of the sensor values of the batch containing the signature of the anomalous event. An example of the latter case may be a support break and crack classifier for identifying support breaks or cracks from acoustic signals generated by an acoustic sensor. It may be necessary to analyse a sequence of acoustic signals to identify an acoustic waveform signature of a support break or crack. However, the anomalous event time (a time at which the support breaks or crack occurs) may be determined from identifying a start of the waveform signature, for example using Akiake's Information Criterion (AIC) as described in Analysis and Efficient Onset Time Detection of Acoustic Emission Signals with Power Constrained Sensor Platform, IEEE Sensors, Babjak, B., S. Szilvasi, P. Volgyesi, O. Yapar, and P. K. Basu, 2013.

Identifying the first anomalous event as a potential cause of the second anomalous event may be based upon a look-up table of possible failure modes of the additive manufacturing process. The look-up table may comprise a list of anomalous events that may occur in an additive manufacturing process, each associated with one or more possible causes. The method may comprise determining whether the earlier, first anomalous event is a possible cause of the later, second anomalous event from the look-up table.

Identifying the first anomalous event as a potential cause of the second anomalous event may be based upon, at least in part, on the time elapsed between the first anomalous event time and the second anomalous event time. For example, the more time that has elapsed between the first anomalous event time and the second anomalous event time, the less likely it may be that the first anomalous event is a potential cause of the second anomalous event.

At least one of the first sensor values and the second sensor values may be associated with a part attribute data label, such as a part identification data label or contour identification data label, and/or a scanning attribute data label, such as a scanning style data label (identifying a set of scanning parameters) or a scanning parameter data label (identifying a particular scanning parameter, such as a scan speed, energy beam power, exposure time, and point distance, hatch spacing, spot size or spot shape). The part attribute identification label allows the sensor values to be sorted based upon an attribute specific to a part. This may be particularly useful in a build comprising multiple parts, allowing the sensor values for one part to be separated from the sensor values for another part (which will not be possible from a layer number alone). This may be at the three-dimensional level for an entire part or at the two-dimensional level for contours of a part.

The corresponding first/second algorithmic classifier may determine the occurrence of the first/second anomalous event, in part, from the part attribute identification data label and/or the scanning attribute data label associated with each sensor value. In order to identify an anomaly. It may be necessary to know the part or contour that is being formed or the scanning style that is being used as anomalies may result in different signatures within the sensor data for different parts, contours and/or scanning styles.

Identifying whether the first anomalous event is the potential cause of the second anomalous event may be based, at least in part, on the part attribute data label and/or the scanning attribute data label associated with each sensor value. For example, identifying whether the first anomalous event as a potential cause of the second anomalous event is based upon the first and second sensor values containing the signatures of the first and second anomalous events being associated with the same part attribute data label and/or a scanning attribute data label.

The output generated may be based upon the part attribute data label and/or the scanning attribute data label associated with the sensor values containing the signature(s) of the first and/or second anomalous events.

It will be understood that the corresponding time associated with each of the first and second sensor values is based upon a common clock such that the relative timing of the generation of the sensor values can be determined.

According to a second aspect of the invention there is provided a system for evaluating sensor data generated during an additive manufacturing process, the system comprising a storage device for storing first sensor data from a first sensor monitoring the additive manufacturing process, the first sensor data comprising a plurality of first sensor values, and second sensor data from a second sensor monitoring the additive manufacturing process, the second sensor data comprising a plurality of second sensor values, wherein each first sensor value and each second sensor value is associated with a corresponding time during the additive manufacturing process at which the sensor value was generated; a first anomaly classifier for analysing the first data to identify a first anomalous event that occurred in the additive manufacturing process and a corresponding first anomalous event time; a second anomaly classifier for analysing the second data to identify a second anomalous event in the additive manufacturing process and a corresponding second anomalous event time; and correlator for identifying whether the first anomalous event is a potential cause of the second anomalous event based upon, at least in part, the first anomalous event time and the second anomalous event time; and an output generator for determining and outputting an output based upon identification by the correlator that the first anomalous event is a potential cause of the second anomalous event.

According to a third aspect of the invention there is provided a computer implemented method comprising receiving first sensor data from a first sensor monitoring an additive manufacturing process, the first sensor data comprising a plurality of first sensor values; receiving second sensor data from a second sensor monitoring the additive manufacturing process, the second sensor data comprising a plurality of second sensor values, wherein each first sensor value and each second sensor value is associated with a corresponding time during the additive manufacturing process at which the sensor value was generated; analysing the first sensor data to identify a first anomalous event that occurred in the additive manufacturing process and a corresponding first anomalous event time; analysing the second sensor data to identify a second anomalous event in the additive manufacturing process and a corresponding second anomalous event time; and displaying a representation showing the relative timings of the first anomalous event and the second anomalous event.

The display may comprise an indication that the first and second anomalous events occurred during the same time window. The time window may be a time for formation (spreading and/or solidification) of a single layer during the additive manufacturing process. The time window may be a time for formation of a single stripe section (which are described in U.S. Pat. No. 8,034,279 and WO2014/125281), single hatch line or single exposure point during the additive manufacturing process.

The display may comprise an indication that the first and second anomalous events occurred during formation of the same part, same contour or when using the same scanning style/scan parameters.

According to a fourth aspect of the invention there is provided a system for evaluating sensor data generated during an additive manufacturing process, the system comprising a storage device for storing first sensor data from a first sensor monitoring the additive manufacturing process, the first sensor data comprising a plurality of first sensor values, and second sensor data from a second sensor monitoring the additive manufacturing process, the second sensor data comprising a plurality of second sensor values, wherein each first sensor value and each second sensor value is associated with a corresponding time during the additive manufacturing process at which the sensor value was generated; and an output generator for determining and a display arranged to display a representation showing the relative timings of the first anomalous event and the second anomalous event.

According to a fifth aspect of the invention there is provided an additive manufacturing method, in which a part is built in a layer-by-layer manner, the additive manufacturing method comprising carrying out an additive manufacturing process, monitoring the additive manufacturing process to generate sensor values and labelling each sensor value with a part attribute data label of a part being formed and/or a scanning attribute data label identifying at least one scanning parameter used at the time the sensor value is generated.

The additive manufacturing process may comprise the formation of a plurality of parts, a plurality of contours and/or use a plurality of scanning styles (sets of scanning parameters) during the generation of the sensor values.

According to a sixth aspect of the invention there is provided an additive manufacturing apparatus which builds parts in a layer-by-layer manner, the additive manufacturing apparatus comprising sensors arranged to monitor an additive manufacturing process to generate sensor values and a controller for labelling each sensor value with a part attribute data label of a part being formed and/or a scanning attribute data label identifying at least one scanning parameter used at the time the sensor value is generated.

According to a seventh aspect of the invention there is provided a computer implemented method comprising receiving sensor data from a sensor monitoring an additive manufacturing process, the sensor data comprising a plurality of sensor values, wherein each sensor value is associated with a part attribute data label of a part being formed and/or a scanning attribute data label identifying at least one scanning parameter used at the time the sensor value was generated; analysing a subset of the values to identify an anomalous event, wherein the subset is selected based upon the part attribute data label and/or the scanning attribute data label associated with the sensor values, and generating an output based on identified anomalous event(s).

The method may further comprise receiving further sensor data from a further sensor monitoring the additive manufacturing process, the further sensor data comprising a plurality of further sensor values, each further sensor value associated with a part attribute data label of a part being formed and/or a scanning attribute data label identifying at least one scanning parameter used at the time the further sensor value was generated, and identifying whether the anomalous event based upon the and the further sensor values labelled with the same part attribute data label and/or a scanning attribute data label.

According to an eighth aspect of the invention there is provided a system for evaluating sensor data generated during an additive manufacturing process, the system comprising a storage device for storing sensor data generated by a sensor monitoring an additive manufacturing process, the sensor data comprising a plurality of sensor values, wherein each sensor value is associated with a part attribute data label of a part being formed and/or a scanning attribute data label identifying a scanning style being used at the time the sensor value was generated; and an anomaly classifier arranged to analyse a subset of the values to identify an anomalous event, wherein the subset is selected based upon the part attribute data label and/or scanning attribute data label associated with the sensor values, and generating an output based on identified anomalous event(s).

According to a ninth aspect of the invention there is provided a data carrier having instructions thereon, which, when executed by a processor, cause the processer to carry out the method of the first, third, fifth and/or seventh aspect of the invention.

The data carrier may be a non-transient data carrier, such as volatile memory, e.g. RAM, non-volatile memory, e.g. ROM, flash memory and data storage devices, such as hard discs, optical discs, or a transient data carrier, such as an electronic or optical signal.

DESCRIPTION OF EMBODIMENTS

WO2017/085469, which is incorporated herein by reference in its entirety, describes an additive manufacturing apparatus, wherein sensor data generated by the additive manufacturing apparatus is associated with a time at which it was generated.

Figure 5:
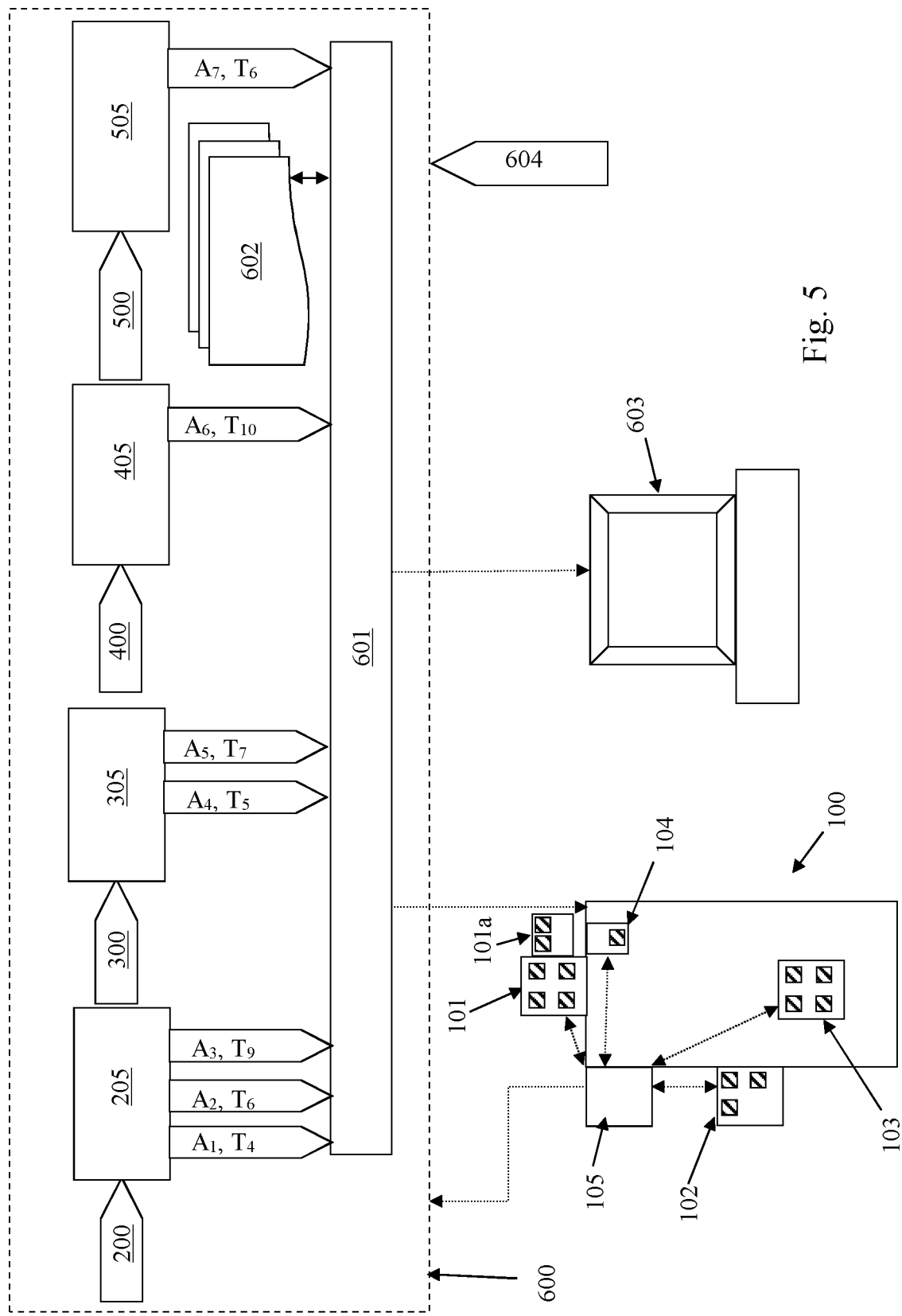
FIG. 5 schematically illustrates a data hub and corresponding connections according to an embodiment of the invention.

Referring to FIG. 5, an additive manufacturing apparatus 100 may comprise a large array of different sensors (schematically illustrated by the small shaded boxes) associated with different modules 101, 102, 103, 104 of the additive manufacturing apparatus. Each sensor value generated by a sensor is packaged in a data packet 201 to 204, 301 to 304, 401 to 404, 501 to 504 together with a time corresponding to when the sensor value was generated. This may be carried out locally at the module 101, 102, 103, 104 or after the sensor value has been sent to a central control unit 105. Each data packet 201 to 204, 301 to 304, 401 to 404 and 501 to 504 may contain sensor values from a plurality of sensors contained in the module 101, 102, 103, 104.

The control unit 105 generates data blocks 200, 300, 400, 500 of sensor data from a plurality of the data packets 201 to 204, 301 to 304, 401 to 404 and 501 to 504 received from each module 101, 102, 103, 104. These data blocks 200, 300, 400, 500 are then output by the additive manufacturing apparatus 100 to a data hub 600 either during the build or at the end of each build. For example, the sensor data may be output after a predetermined number of layers have been formed, such as one or more layers. In this way, the sensor data may be displayed and analysed during the build. The data hub 600 carries out analysis of the sensor data to identify anomalous events during the additive manufacturing process.

Referring to FIGS. 1 to 4, four examples of sensor data assembled by the control unit 104 are shown.

Figure 1:
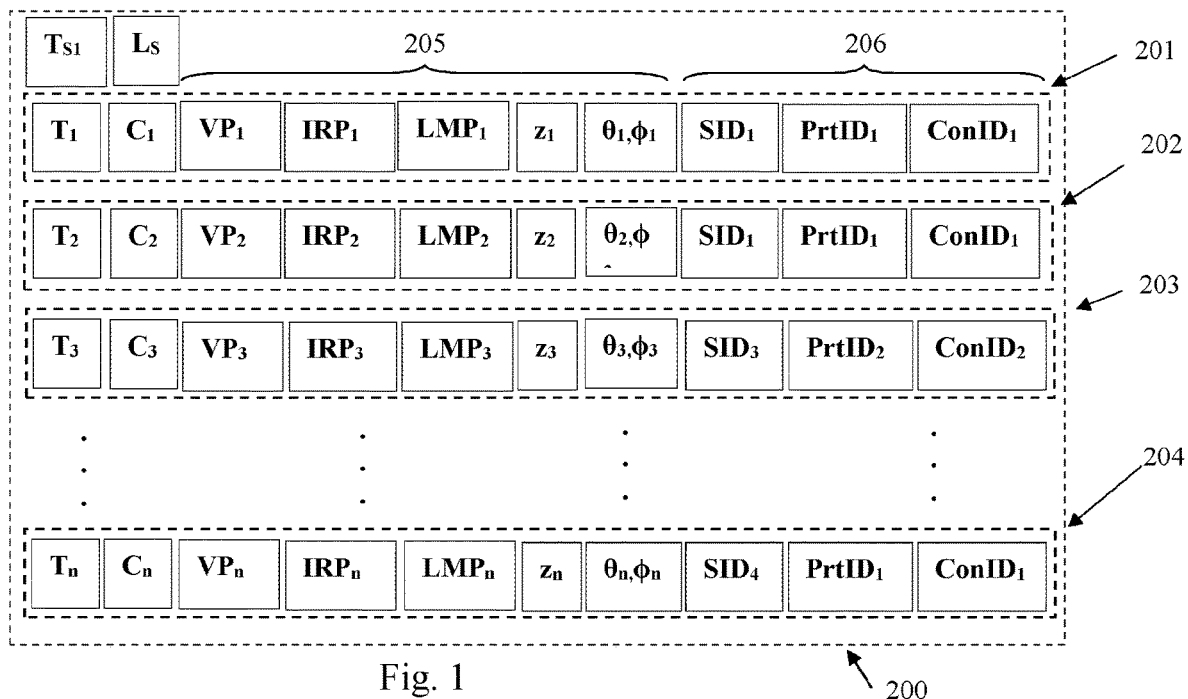
FIG. 1 schematically illustrates a data structure for data reported by an optical scanner of an additive manufacturing apparatus according to an embodiment of the invention.

FIG. 1 illustrates sensor data assembled from sensor values generated by the sensors in a scanning module 101 of the additive manufacturing apparatus. The sensor data comprises packets 201 to 204 of sensor data generated during the additive manufacturing process. The sensor data for each packet 201 to 204 is generated when the optical scanning module executes a corresponding command $C_1$ to $C_n$. The commands $C_1$ to $C_n$ are generated by the scanning module 101 in response to geometric or scanning data sent to the scanning module 101 from control unit 104. For example, the scanning data may comprise a series of layers to be solidified to form a part and/or a series of vectors or lines or exposure points to be scanned on a layer-by-layer basis. The scan vectors/exposure points are associated with a time at which the scan vectors/exposure points are to be exposed to the laser beam. The scanning module 101 converts this scanning data into commands $C_1$ to $C_n$ for each layer and allocates a corresponding time $T_1$ to $T_n$ for execution of the command. The commands $C_1$ to $C_n$ will typically comprise demanded positions for scanning optics, such as galvanometer controlled tiltable mirrors, for steering a laser beam over a powder bed, demanded focal position of focal optics for focusing the laser beam, demanded power of the laser beam and commands to capture measured values for the mirror positions, focal optic positions and measured laser power, for example using a sensor for detecting laser light transmitted to a beam dump, as described in WO2017/085468.

The scanning module 101 may also comprise a melt region detecting module 101a for detecting light emitted from the melt region during solidification of selected areas of the powder bed and collected by the optical train that delivers the laser light, for example as described in WO2017/085468. In this embodiment, the melt region detecting module 101a comprises integrating sensors, which generate sensor values proportional to an amount of light within a particular range of wavelengths received from the field of view. In this embodiment, the integrating sensors comprise a visible light sensor and an infrared sensor.

The sensor values 205 captured from these sensors of the scanning module 101 on execution of each command $C_1$ to $C_n$ are collated to form a data packet 201 to 204. Each data packet is labelled or tagged with the time T associated with the corresponding command, $C_1$ to $C_n$, which caused the sensor signals to be captured. In this embodiment, the sensor values 205 comprise a visible light photodiode value VP, an infrared photodiode value IRP, a laser beam monitoring photodiode value LMP, a focal length value z and measured position of the tiltable mirrors θ and φ.

The data packets 201 to 204 further contain the demand signals $C_1$ to $C_n$ and labels SID, PrtID and ConID.

SID stands for "Scanning style ID" and is a label that identifies a scanning style (scanning parameter set) that is being applied by the additive manufacturing apparatus at that time $T_1$ to $T_n$. When designing an additive manufacturing build, a scanning style or scanning parameters will be selected (either automatically or by the user) for solidifying the material. Scanning parameters typically comprise laser power, scan speed or point distance and exposure time, spot size (focal distance) and hatch distance. Different scanning parameters or build styles may be used for different portions of the build. When generating the demand data, the scanning module 101 converts these scanning parameters into the required demand positions for the various components of the scanning module 101. The scanning style ID provides a label linking the sensor values to the scanning parameters/build style that was being carried out when the sensor values were captured. In this way, the sensor data can be sorted based upon the set of scanning parameters being used/build style PrtID stands for "Part ID" and is a label that identifies a part being formed at the time the sensor values are captured. Multiple parts may be built together in an additive build and the PrtID label enables the sensor data to be sorted based upon the part being formed at the time the sensor values were captured.

ConID stands for "Contour ID" and is a label that identifies a two-dimensional contour or layer being formed for a particular part at the time the sensor values are captured. This ConID label enables the sensor data to be sorted based upon the contour being formed at the time the sensor values were captured.

In an embodiment (not shown) wherein the additive manufacturing apparatus comprises multiple optical trains for simultaneously delivering multiple laser beams, for example as described in WO2017/085470, each optical train associated with a corresponding melt region detecting module 101a, each data packet may be further labelled with a laser beam ID identifying the optical train and detecting module combination that generated the sensor values in that data packet. In such an embodiment, there would be multiple data packets for a single time $T_1$ to $T_n$.

Each data packet 201 to 204 is sent from the scanning module 101 to the control unit 105. The control unit 105 assembles the data packets 201 to 204 into a data block 200 of data packets 201 to 204, which are then transmitted onto data hub 600. In this embodiment, each data block comprises all data packets 201 to 204 for a single layer of the build. The control unit 105 labels the data block 200 with a system time $T_s$ and a layer number $L_n$. In this embodiment, each data block 200 is labelled with a system time $T_s$ corresponding to a time read from an internal clock of the control unit 105 at which the first data packet 201 of the data block 200 was received. This time will substantially correspond to a time at which formation of a layer begun, taking into account any transmission delays between the scanning module 101 and the control unit 105 (which are likely to be very small compared to sampling rates).

Figure 2:
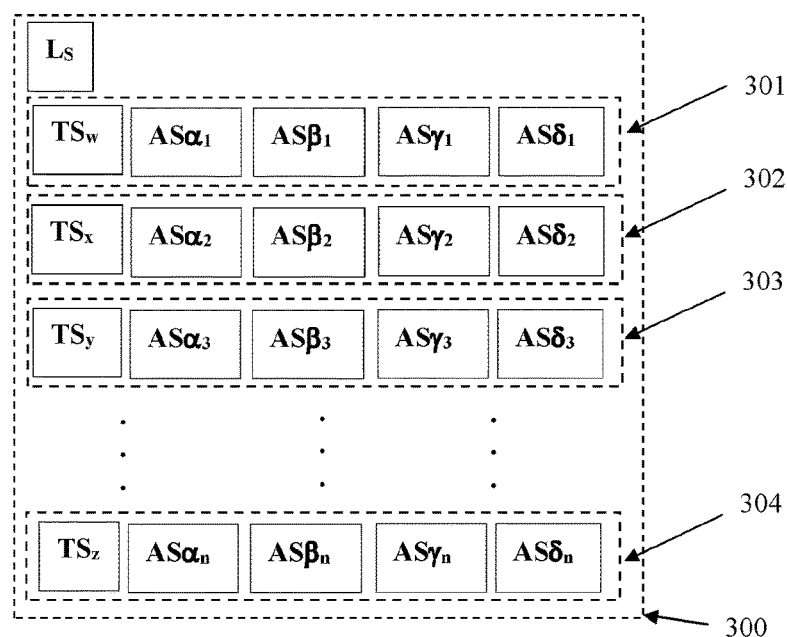
FIG. 2 schematically illustrates a data structure for data reported by an acoustic sensing system of the additive manufacturing apparatus.

FIG. 2 illustrates sensor data generated by an acoustic module 102. The acoustic module 102 may comprise a plurality of acoustic emission sensors attached to a build substrate or build platform of an additive manufacturing apparatus in accordance with the disclosure in WO 2016/198885 and UK patent application No. 18181186.0. In this embodiment, the acoustic module 102 comprises four acoustic sensors and returns data packets 301 to 304 of the acoustic sensor values $AS\alpha_1$, $AS\beta_1$, $AS\gamma_1$, $AS\delta_1$ from each acoustic sensor if all four acoustic sensors record a sensor value above a predetermined threshold value within the same time window, such as within a 20-microsecond time window. In this embodiment, the acoustic sensor values $AS\alpha_1$, $AS\beta_1$, $AS\gamma_1$, $AS\delta_1$ returned for each acoustic sensor in a packet 301 to 304 corresponds to sensor values recorded over a predetermined interval that includes the sensor value that is above the threshold value. In this embodiment, the interval may be of the order of tens of microseconds. It is useful to return an interval of acoustic signals because the profile of the acoustic signal can be analysed to identify a start of a waveform of interest, as is disclosed in UK patent application No. 18181186.0, and a timing of the acoustic signal of interest may vary slightly between acoustic sensors because of differences in a time of arrival of a signal of interest between the acoustic sensors.

On receiving a data packet from the acoustic sensing module 102, the control unit 105 labels the data packet with a system time $T_s$ at which the data packet was received by the control unit 105. As the data packets from the acoustic sensing module 102 are only generated when acoustic sensor values are above a predetermined threshold, the data packets from the acoustic sensing module 102 may not be received at regular time intervals, schematically illustrated by the use of $T_{sw}$, $T_{sx}$, $T_{sy}$, and $T_{sz}$. Control unit 105 may collate the data packets 301 to 304 into a data block 300, for example on a layer-by-layer basis, the data block 300 sent to data hub 600 at regular intervals for display and analysis. Each data block 300 is labelled with a layer number $L_n$.

Figure 3:
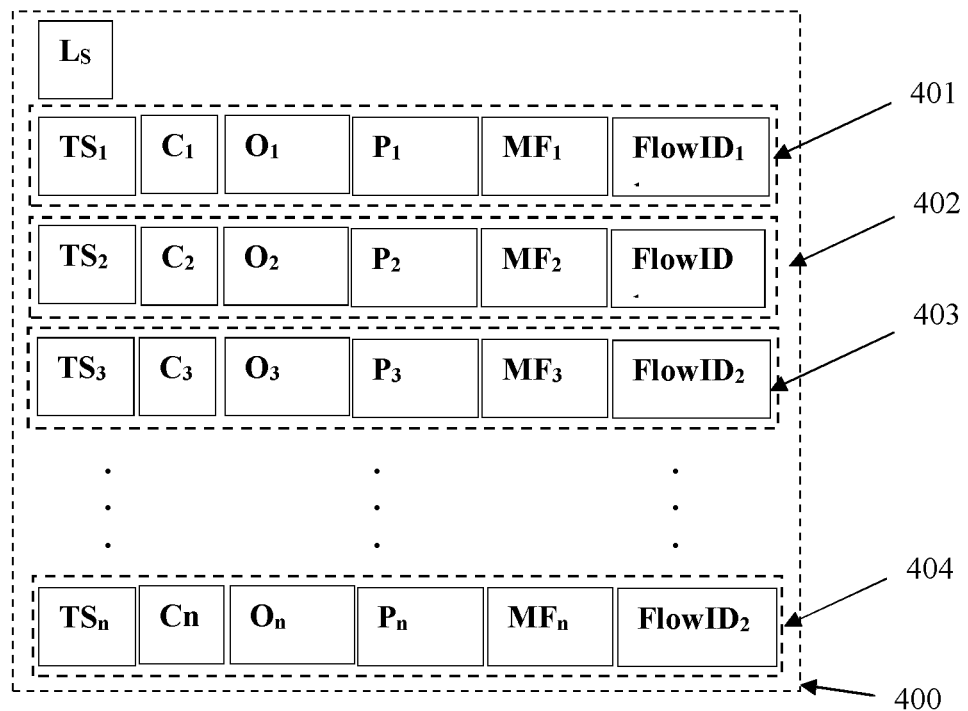
FIG. 3 schematically illustrates a data structure for data reported by a gas monitoring system of the additive manufacturing apparatus.

FIG. 3 schematically illustrates sensor data captured by a gas flow system 103 of the additive manufacturing apparatus. It is known to carry out the additive manufacturing process in an inert gas (low oxygen) atmosphere comprising a gas knife for carrying away gas-borne particles ejected from the melt region during solidification. A gas flow circuit is typically provided for forming the inert gas environment. An example of a gas flow system that may be used in the invention is described in EP3147047. In this embodiment, the gas flow system comprises a mass flow sensor for measuring a gas flow rate through the gas circuit and module 103 controls the gas flow based upon the measured mass flow rate, for example to maintain a constant velocity of the gas knife over a powder bed. The gas flow system 103 further comprises an oxygen sensor for measuring oxygen levels in the inert atmosphere and pressure sensors for measuring a pressure difference across a filter, which filters particles from the gas flow. Examples of such sensors are described in WO2016/079494 and EP2786858.

The oxygen sensor values $O_1$, pressure values $P_1$ and mass flow sensor values $MF_1$ are sent to the control unit in data packets 401 to 404 based upon the time which they are generated. The data packets 401 to 404 may also comprise demand data C for the gas flow module 104 and FlowID label, which may link the sensor values to user defined flow styles if the gas flow through the build chamber can be user set. For example, the user may be able to set the gas flow rate, the pressure in a build chamber and, in the case of movable nozzles as described in WO2014/199150, absolute or relative positions of the movable nozzles, a temperature of cooled gas introduced into the build chamber, for example as described in WO2016/102970, or other adjustable/settable elements of the gas flow system.

The data packets 401 to 404 are sent to the control unit 105 from the gas flow system 103. On receiving a data packet from the gas flow system 103, the control unit 105 labels the data packet 401 to 404 with a system time $T_s$ at which the data packet was received by the control unit 105. A plurality of the data packets 401 to 404 may then be collated into a data block 400, for example on a layer-by-layer basis, labelled with a layer number $L_n$ and sent to data hub 600.

Figure 4:
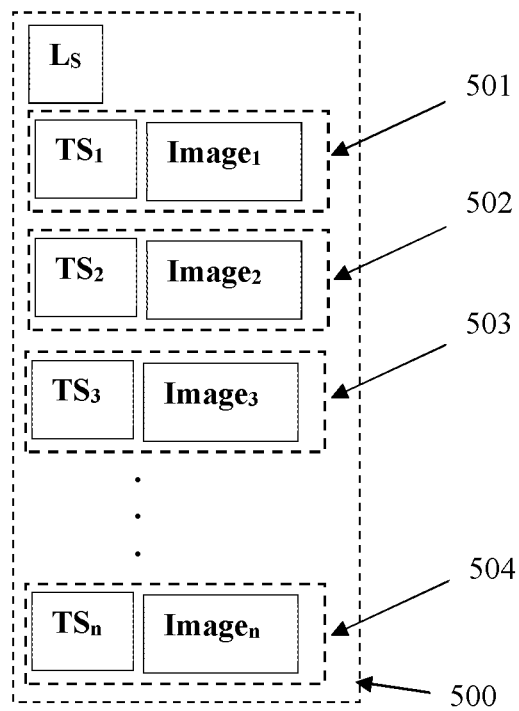
FIG. 4 schematically illustrates a data structure for data generated by a camera system.

FIG. 4 schematically illustrates sensor data captured by a camera system 104 of the additive manufacturing apparatus. The camera system 104 comprises at least one camera, such as a visible light and/or infrared camera, which captures images of the full bed. The images may be captured after a powder layer has been formed and/or after solidification of a layer has been completed but before formation of the next powder layer. Each Image $Image_1$ is sent to the control module 105. On receiving a data packet 501 to 504 from the camera system 104, the control unit 105 labels each image with a system time $T_s$ at which the image was received by the control unit 105. The data packet comprising the image, layer number $L_n$ and the system time label is sent to data hub 600.

Referring to FIG. 5, the data hub comprises anomaly classifiers 205, 305, 405 and 505 for identifying anomalous events that occurred during the build from the sensor data. In FIG. 5, an anomaly classifier is shown as being applied to the sensor data generated by each module 101, 102, 103 and 104 and the apparatus 101.

For example, the photodiode values VP or IRP may be analysed by the anomaly classifier 205 to identify anomalous events such as undesirable heat build-up during the build or regions which were not heated sufficiently to consolidate the powder. To determine whether the intensity values of the photodiodes are above or below typical values, the build style SID being used may be taken into account by the classifier (i.e. what may be deemed too intense for one build style may be acceptable for another build style). Alternatively or additionally, the anomaly classifier 205 may determine regions where there are overly large errors between the demanded position and measured position or the demanded laser power and the measured laser power. More complex statistical analysis may be a carried out to identify anomalous events, which may include the application of machine learning techniques and, as such, the classifier may comprise "a black box" in terms of the principles being applied to identify the anomalous event.

The anomaly classifier 305 for the acoustic data 300 may identify anomalous events, such as cracks, support breaks and/or wiper collisions that occur during the build. Again, the classifier 305 may have been determined using machine learning techniques.

The anomaly classifier 405 for the gas flow data may identify anomalous events, such as sudden changes in mass flow rates and/or differential pressure across the filter(s) and/or increases or decreases in oxygen levels. Again, it may be necessary for the classifier to consider the gas flow style being used at the time the sensor values were generated, e.g. that a sudden change in mass flow rate was not caused by an expected change in mass flow rate.

The anomaly classifier 505 for the camera system data may identify anomalous events such as under-dosing of a layer and/or deformations of the part being built which results in the part protruding above the working surface of the powder bed. Again, machine learning techniques may be used in the creation of the classifier for recognising features in the images.

A further category of anomaly classifier may be provided, one that analyses data generated from a fusion of the sensor data obtained from different modules 101, 102, 103, 104. For example, when analysing the acoustic data, it may be useful for the classifier to know the build style being used and/or part or contour being formed at the time the acoustic data was generated. In particular, the nature of the acoustic data may depend on the build parameters being used, the geometry of the part and/or contour being built. This information is contained in the sensor data 200 from the scanning module 101. The acoustic data 300 can be correlated with the sensor data 200 through the time labels associated with the sensor data. First a data block 200 of the sensor data from the scanning module 101 corresponding to a particular data packet 301 to 304 of acoustic data is identified through the system times $T_s$ allocated to the data blocks 200 and the data packets 301 to 304. For example, from the system times associated with the data blocks 200, the data hub 600 can work out the start time of layer and the start time of the next layer. From these times, the data hub 600 can work out during the formation of which layer the particular data packet 301 to 304 of acoustic data was generated (or, as an alternative, based on the layer number $L_n$). The particular scanning module sensor data 201 to 204 corresponding to the particular acoustic data can then be determined from the time T associated with each data packet 201 to 204. The times T are not in system time but at regular spaced time intervals, such as every 10 microseconds. Accordingly, a system time of a data packet 201 to 204 corresponding to the particular acoustic data is determined from a combination of the system time associated with the data block 200 and the times T associated with the data packets 201 to 204 of that data block 200. Once the corresponding data packet 201 to 204 has been found the relevant scanning module data can be associated with the particular acoustic data to enable the analysis by the classifier.

Similar associations can be made by the data hub 600 between the data generated from other modules 101 to 104 of the additive manufacturing using the times $T_s$ associated with the data.

Each anomaly classifier 205, 305, 405, 505 generates outputs comprising anomalous events A, each associated with a corresponding anomalous event time T (in system time) of when the anomalous event occurred/started. The outputs from the classifiers 205, 305, 405, 505 are sent to correlator 601.

The correlator 601 identifies whether an earlier anomalous event $A_1$ to $A_5$ is a potential cause of a later anomalous event $A_2$ to $A_6$ (as can be determined from the times $T_2$ to $T_6$ associated with the anomalous events $A_2$ to $A_6$). In this embodiment, the correlator 601 queries a look-up table 602 of possible failure modes of the additive manufacturing apparatus 101 to determine if a first anomalous event $A_1$ to $A_5$, identified by the anomaly classifiers 205, 305, 405, 505 is a potential cause of a second anomalous event $A_2$ to $A_6$ identified by the anomaly classifiers 205, 305, 405, 605. The likelihood that an earlier anomalous event $A_1$ to $A_5$ is a cause of a later anomalous event $A_2$ to $A_6$ may be based upon a length of time between the earlier anomalous event and the later anomalous event. This may be based on an expected time frame between the earlier and later anomalous events. The look-up table may also comprise data on the expected time frame between two anomalous events indicative of a failure mode of the additive manufacturing apparatus. The time frame may be an absolute time frame, for example, if an under-dosing of layer is detected in the camera images, an acoustic signature of that under-dosing is expected to occur in the time frame for formation of that layer and at no other time. Whereas a signature of the under-dosed layer may persist in the photodiode data of the scanning module because the solidification of the under-dosed powder layer may be anomalous as the powder layer is thinner than expected but a subsequent powder layer may be thicker than expected as the powder has filled in the regions under-dosed on the precious layer. Accordingly, a photodiode signature of an under-dosed layer may persist for a number of layers. Hence the expected time frame for the photodiode sensor data may differ from that of the acoustic data for such a process anomaly.

Furthermore, the look-up table may indicate whether the anomalous event is expected to be a reoccurring anomaly in the sensor data. For example, under-dosing of a powder layer may not necessarily reoccur, whereas an anomalous line in a dosed powder layer caused by damage to the wiper may be expected to reoccur for multiple layers until the wiper is replaced.

The correlator 601 generates an output based upon the identification that an earlier anomalous event as a potential cause of a later anomalous event. The output results in the potential cause and effect association between the two anomalous events being displayed on a display. The display may be on a computer 603 remote from the additive manufacturing apparatus and/or on the additive manufacturing apparatus 101. In this embodiment, the display comprises a display of the identified anomalous events on a timeline (in system time). The anomalous events may be displayed such that a user can differentiate between minor and major anomalous events and the sensor modality used to identify the anomalous event.

The data hub 600 is arranged such that the user can add additional anomaly classifiers for analysing the sensor data through input 604. A user may carry out destructive or non-destructive testing of parts built using an additive manufacturing process to determine if parts meet defined specifications and to identify failures. Furthermore, the user may carry out a human analysis of the sensor data generated by a build to identify anomalies in the sensor data. From such analysis, the user may determine an algorithm for processing the sensor data to identify anomalous events. For example, the user identified anomalies could be used to teach a computer through machine learning to identify the anomalies from the sensor data. The user can add such algorithm as classifiers to the data hub 600 as they are generated.

It will be understood that modifications and alterations can be made to the above described embodiment without departing from the invention as defined herein. For example, other ways of tabulating the sensor data, demand data and identification labels may be used. The additive manufacturing apparatus may comprise further modules with associated sensors, such as powder transport modules. The sensor values generated by the sensors of these further modules may also be analysed using the data hub 600 to identify anomalous events.

The invention claimed is:

1. A computer implemented method comprising:
receiving first sensor data from a first sensor monitoring an additive manufacturing process, the first sensor data comprising a plurality of first sensor values;
receiving second sensor data from a second sensor monitoring the additive manufacturing process, the second sensor data comprising a plurality of second sensor values,
each first sensor value and each second sensor value being associated with a corresponding time during the additive manufacturing process at which the sensor value was generated;
analyzing the first sensor data to identify a first anomalous event that occurred in the additive manufacturing process and a corresponding first anomalous event time;
analyzing the second sensor data to identify a second anomalous event in the additive manufacturing process and a corresponding second anomalous event time;

calculating a length of time between the first anomalous event time and the second anomalous event time;

comparing the calculated length of time to an expected time frame;

identifying whether the first anomalous event is a potential cause of the second anomalous event based upon, at least in part, a result of the comparison of the calculated length of time to the expected time frame; and generating an output based upon an identification that the first anomalous event is a potential cause of the second anomalous event, wherein the output comprises one or more of:
i) a command signal, which causes a change in the additive manufacturing process; and
ii) a modification of build instructions for a future additive manufacturing process.

2. The computer implemented method according to claim 1, wherein the second sensor senses a different sensory modality to the first sensor.

3. The computer implemented method according to claim 1, wherein the corresponding time provides a unique key of a database comprising the first and second sensor data.

4. The computer implemented method according to claim 3, wherein
the database includes demand data issued to the additive manufacturing apparatus for carrying out a build, and
the first anomalous event and/or the second anomalous event are/is identified from a combination of the first and/or second sensor data and the demand data.

5. The computer implemented method according to claim 4, wherein
the demand data comprises a plurality of commands, each command associated with a time at which the command is to be executed, and
the first anomalous event and/or the second anomalous event are/is identified from a comparison of the first and/or second sensor values with the command associated time the same as the corresponding time of the first and/or second sensor values.

6. The computer implemented method according to claim 1, wherein
the first anomalous event and the first anomalous event time are determined using a first algorithmic classifier, and
the second anomalous event and the second anomalous event time are determined using a second, different algorithmic classifier.

7. The computer implemented method according to claim 6, wherein
at least one of the first sensor values and the second sensor values are associated with a part attribute data label and/or a scanning attribute data label, and
the corresponding first/second algorithmic classifier determines the occurrence of the first/second anomalous event, in part, from the part attribute data label and/or the scanning attribute data label associated with each sensor value.

8. The computer implemented method according to claim 1, wherein
the first sensor values and the second sensor values are associated with a part attribute data label and/or a scanning attribute data label, and
identifying whether the first anomalous event is the potential cause of the second anomalous event is based, at least in part, on the part attribute data label and/or the scanning attribute data label associated with each sensor value.

9. The computer implemented method according to claim 8, wherein identifying whether the first anomalous event is the potential cause of the second anomalous event is based upon the first and second sensor values containing signatures of the first and second anomalous events being associated with the same part attribute data label and/or scanning attribute data label.

10. The computer implemented method according to claim 1, wherein
at least one of the first sensor values and the second sensor values are associated with a part attribute data label and/or a scanning attribute data label, and
the output generated is based upon the part attribute data label and/or the scanning attribute data label associated with the sensor values containing signature(s) of the first and/or second anomalous events.

11. The computer implemented method according to claim 1, wherein identifying whether the first anomalous event is the potential cause of the second anomalous event is based upon a look-up table of possible failure modes of the additive manufacturing process.

12. A system for evaluating sensor data generated during an additive manufacturing process, the system comprising
a storage device for storing (i) first sensor data from a first sensor monitoring the additive manufacturing process, the first sensor data comprising a plurality of first sensor values, and (ii) second sensor data from a second sensor monitoring the additive manufacturing process, the second sensor data comprising a plurality of second sensor values, each first sensor value and each second sensor value being associated with a corresponding time during the additive manufacturing process at which the sensor value was generated;
a first anomaly classifier for analyzing the first sensor data to identify a first anomalous event that occurred in the additive manufacturing process and a corresponding first anomalous event time;
a second anomaly classifier for analyzing the second sensor data to identify a second anomalous event in the additive manufacturing process and a corresponding second anomalous event time;
a calculator for calculating a length of time between the first anomalous event time and the second anomalous event time;
a comparer for comparing the calculated length of time to an expected time frame;
a correlator for identifying whether the first anomalous event is a potential cause of the second anomalous event based upon, at least in part, a result of the comparison of the calculated length of time to the expected time frame; and
an output generator for determining and outputting an output based upon identification by the correlator that the first anomalous event is a potential cause of the second anomalous event,
wherein the output comprises one or more of:
i) a command signal, which causes a change in the additive manufacturing process; and
ii) a modification of build instructions for a future additive manufacturing process.

13. A non-transitory computer-readable data carrier having instructions thereon, which, when executed by a processor, cause the processer to carry out the method of claim 1.

* * * * *